UNITED STATES PATENT OFFICE.

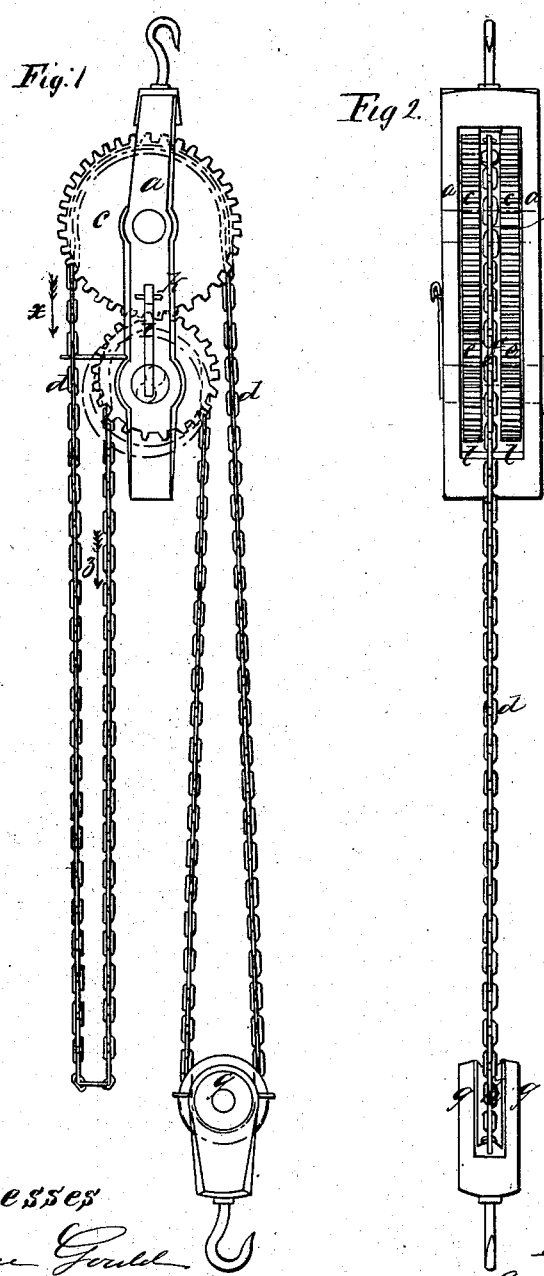

JOSEPH A. TALPEY, OF SOMERVILLE, MASSACHUSETTS.

IMPROVEMENT IN HOISTING APPARATUS.

Specification forming part of Letters Patent No. 47,878, dated May 23, 1865.

*To all whom it may concern:*

Be it known that I, JOSEPH A. TALPEY, of Somerville, in the county of Middlesex and State of Massachusetts, have invented Improved Tackle or Hoisting Apparatus; and I do hereby declare that the following, taken in connection with the drawings, which accompany and form part of this specification, is a description of my invention sufficient to enable those skilled in the art to practice it.

This invention relates to the employment of hoisting-tackle for raising and lowering heavy bodies, the object of the invention being to afford a ready means in such apparatus for holding the body in suspension at any point without necessity of belaying the slack of the pulley chain or rope. Hoisting apparatus for this purpose has already been made and used, the same consisting of two sprocket-wheels or pulleys of unequal diameter, fixed on the same shaft and integral with each other, or moving as one wheel in the block, and an endless chain, working in connection with the teeth of the two sprocket-pulleys.

My improvement consists in the employment, in connection with an endless chain, of two separate sprocket-wheels geared together, the proportion of the respective diameter of the gear and sprocket-wheel of one shaft varying slightly from that of the gear and sprocket upon the other shaft; also in so applying the lower sprocket-wheel that it can be thrown out of connection with the upper one and locked in position to prevent its rotation, thus permitting the chain to be overhauled upon the upper sprocket, which acts as a simple pulley.

Figures 1 and 2 of the drawings represent, respectively, a side and front elevation of a tackle or hoisting apparatus embodying my improvement.

*a* denotes the upper or stationary block, carrying a pulley or sprocket-wheel, *b*, having a gear-wheel, *c*, integral with or fixed to one or both sides of it, as seen in Fig. 2, the space between the gears serving as a guide-groove to the endless chain *d*, which passes over it, as will be readily understood. The gear or gears *c* mesh into another gear or gears, *e*, mounted in the shell of the block *a* and below the gears *c*, said gear or gears *e* being fixed upon one or both sides of a pulley or sprocket-wheel, *f*. The endless chain *d* passes over the pulley *f* from the same side of the block that it passes over the other pulley *b*, and there is hung or suspended to the chain upon one side of the block *a* a block, *g*, carrying a loose pulley, *h*, around which the chain traverses. Supposing the upper block to be stationary and a weight to be suspended from the lower block, it will be obvious that, if the diameter of the sprocket-wheel *b* bears the same proportion to the diameter of the gear or gears to which it is fixed, the diameter of the sprocket-wheel or pulley *f* bears to its gear, that overhauling the chain would produce neither rise nor descent of the block *h* or the weight suspended therefrom. If, however, this proportion is varied, then overhauling the chain will produce the rise or fall of the weight—as, for instance, suppose the upper sprocket-wheel to contain twenty teeth and the lower gear to be half the size of the upper one. Now, if, instead of making the lower sprocket-wheel with ten teeth, its diameter be decreased until nine teeth fill its circumference, the adjacent sprocket-teeth in both wheels being of course equidistant, it will be obvious that in hoisting by drawing upon the slack, as denoted by the arrow *x*, each revolution of the upper gear takes up twenty links of the chain and lets off eighteen from the lower wheel, thus gaining the length of two links at each revolution of the upper gear, while in lowering, by drawing upon the slack, as denoted by the arrow *z*, the effect is the opposite, twenty links being let off by the upper wheel while but eighteen are taken up by the lower one. Theoretically, of course a weight hung upon the lower block would with such a construction cause the chain to overhaul of itself, but practically, with only a slight difference in the relation of the diameters as specified, very heavy bodies can be readily raised and lowered, and will be held in suspension at any point in the operation without belaying or fastening the slack, the friction being sufficient for this purpose.

In machine-shops, forges, and other places where heavy bodies are hoisted and moved about for manipulation such an apparatus is found very convenient and useful.

By employing the separate sprocket-wheels geared together, as shown, instead of two sprocket-wheels upon one shaft, the slack of the chain hangs upon the opposite side of the gears from that part of the chain to which the weight is suspended without the use of guide-pulleys and without danger of causing interference of the slack with the other part of the chain. Moreover, the lower sprocket-pulley can be easily removed with its gear for replacement, when advisable, by others having slightly-varying diameters; but, besides this, it is desirable to so construct the apparatus that the chain can be overhauled upon one of the sprockets as a simple pulley without the intervention or co-operation of the other. To accomplish this, I mount the lower sprocket upon a shaft eccentric with its journals, so that by releasing a latch-spring, $i$, from its catch $k$ and rotating the spring a half-revolution the lower gear is carried out of connection with the upper one, its downward movement at the same time bringing a key, $l$, in the block between the two adjacent lowermost teeth of the gear, thus locking the lower gear in position and preventing its rotation. It will now be obvious that the chain may be overhauled upon the upper pulley in either direction and as fast as the pulley is rotated. This is desirable in raising and lowering the lower block to bring it to any desired position when there is no weight upon it, at which time it is of course not necessary or desirable to compound the upper pulley with the lower one to increase the power, it being more desirable to readily and quickly bring the lower block into position.

Instead of the construction described, there may be a slight difference made in the sizes of the teeth of the respective gears or in the distance apart of the sprocket-teeth upon the respective pulleys, but I consider the construction shown to be preferable.

I claim—

1. The improved tackle or hoisting apparatus, consisting of two sprocket-pulleys arranged, constructed, and geared together, and operating in conjunction with the endless chain and the loose block, substantially as specified.

2. So applying the lower sprocket-pulley that it may be disconnected from the upper one and keyed or fastened in position in the manner and for the purpose substantially as set forth.

In witness whereof I have hereunto set my hand this 19th day of January, A. D. 1865.

JOSEPH A. TALPEY.

In presence of—
 FRANCIS GOULD,
 W. B. GLEASON.